(12) United States Patent
Takao et al.

(10) Patent No.: US 7,866,704 B2
(45) Date of Patent: Jan. 11, 2011

(54) SEAT BELT RETRACTOR AND SEAT BELT APPARATUS

(75) Inventors: Masato Takao, Tokyo (JP); Koji Inuzuka, Tokyo (JP); Koji Tanaka, Tokyo (JP); Daisuke Murakami, Tokyo (JP)

(73) Assignee: Takata Corporation, Tokyo (JP)

( * ) Notice: Subject to any disclaimer, the term of this patent is extended or adjusted under 35 U.S.C. 154(b) by 185 days.

(21) Appl. No.: 12/222,501

(22) Filed: Aug. 11, 2008

(65) Prior Publication Data
US 2009/0058063 A1 Mar. 5, 2009

(30) Foreign Application Priority Data
Sep. 3, 2007 (JP) ............................ 2007-227426

(51) Int. Cl.
*B60R 22/34* (2006.01)
(52) U.S. Cl. .................................. 280/807; 242/390.8
(58) Field of Classification Search ................ 180/268; 280/807; 242/390.8, 390.9, 374; 297/474, 297/475, 477; 174/66, 67
See application file for complete search history.

(56) References Cited

U.S. PATENT DOCUMENTS

| | | | | |
|---|---|---|---|---|
| 4,787,569 | A * | 11/1988 | Kanada et al. | ............... 242/371 |
| 5,765,774 | A | 6/1998 | Maekawa et al. | |
| 6,447,012 | B2 | 9/2002 | Peter et al. | |
| 6,598,823 | B1 * | 7/2003 | Fujii et al. | ............... 242/390.8 |
| 6,797,884 | B2 * | 9/2004 | Kubota | ......................... 174/66 |
| 2007/0114775 | A1 | 5/2007 | Inuzuka et al. | |
| 2008/0105777 | A1 | 5/2008 | Holbein et al. | |
| 2008/0314672 | A1 * | 12/2008 | Takimoto et al. | ............. 180/274 |

FOREIGN PATENT DOCUMENTS

| | | |
|---|---|---|
| EP | 1 731 388 A1 | 12/2006 |
| JP | 8-40204 | 2/1996 |
| JP | 9-272401 | 10/1997 |
| JP | 2000-135969 | 5/2000 |
| JP | 2001-130376 | 5/2001 |
| JP | 2001-130377 | 5/2001 |
| JP | 2001-187561 | 7/2001 |
| JP | 2001-199309 | 7/2001 |
| JP | 2007-145079 | 6/2007 |

OTHER PUBLICATIONS

Supplementary European Search Report issued Jan. 19, 2010 on European Patent Application No. 08008934-5. (3 pgs.).

* cited by examiner

*Primary Examiner*—Paul N Dickson
*Assistant Examiner*—Joseph Rocca
(74) *Attorney, Agent, or Firm*—Foley & Lardner LLP (57) ABSTRACT

A seat belt retractor includes at least one frame having a back board and side walls extending from side rims of the back board, a spool supported by the at least one frame configured to wind up a seat belt, a motor configured to rotate the spool, and an electronic control unit mounted to the frame for controlling the driving of the motor. The electronic control unit includes a base, an electronic control unit board fixed to the base, and a cover attached to the base to cover the electronic control unit board. The electronic control unit includes an opening at a lower end that opens an interior of the electronic control unit to an exterior.

9 Claims, 7 Drawing Sheets

SEAT BELT RETRACTOR AND SEAT BELT APPARATUS

BACKGROUND

The present application relates generally to the field of a seat belt retractor for retraction and/or withdrawal by rotating a spool with an electric motor and to a seat belt unit including the retractor. More particularly, the present application relates to a seat belt retractor in which the electric motor may be controlled by an electronic control unit (ECU) and to a seat belt unit using the retractor.

Conventional seat belt units installed in vehicles restrain occupants in an emergency such as a crash or collision to reduce the likelihood the occupants may be ejected from their seats. Seat belt units include a seat belt retractor for retracting the seat belt. When not in use, the seat belt may be retracted by a spool and may be withdrawn from the spool when required (e.g., when fastened by an occupant). The seat belt retractor includes a locking mechanism that is activated in the event of an emergency to stop the rotation of the spool in the direction of seat belt withdrawal. The seat belt withdrawal is stopped so the occupant can be restrained (e.g., in the event of an emergency).

SUMMARY

One embodiment of the application relates to a seat belt retractor that includes at least one frame having a back board and side walls extending from side rims of the back board, a spool supported by the at least one frame configured to wind up a seat belt, a motor configured to rotate the spool, and an ECU mounted to the frame for controlling the driving of the motor. The ECU includes a base, an ECU board fixed to the base, and a cover attached to the base to cover the ECU board. The ECU includes an opening that opens an interior of the electronic control unit to an exterior.

BRIEF DESCRIPTION OF THE DRAWINGS

These and other features, aspects, and advantages of the present invention will become apparent from the following description, appended claims, and the accompanying exemplary embodiments shown in the drawings, which are briefly described below. The terms "left" and "right" in the specification refer to the left and right in the corresponding diagrams.

FIGS. 2(a)-2(c) are perspective views showing an ECU that may be used in the seat belt retractor of FIG. 1, according to exemplary embodiments: FIG. 2(a) is a perspective view of the base, FIG. 2(b) is a perspective view of the ECU, and FIG. 2(c) is a perspective view of the cover.

DETAILED DESCRIPTION

Figure 6:
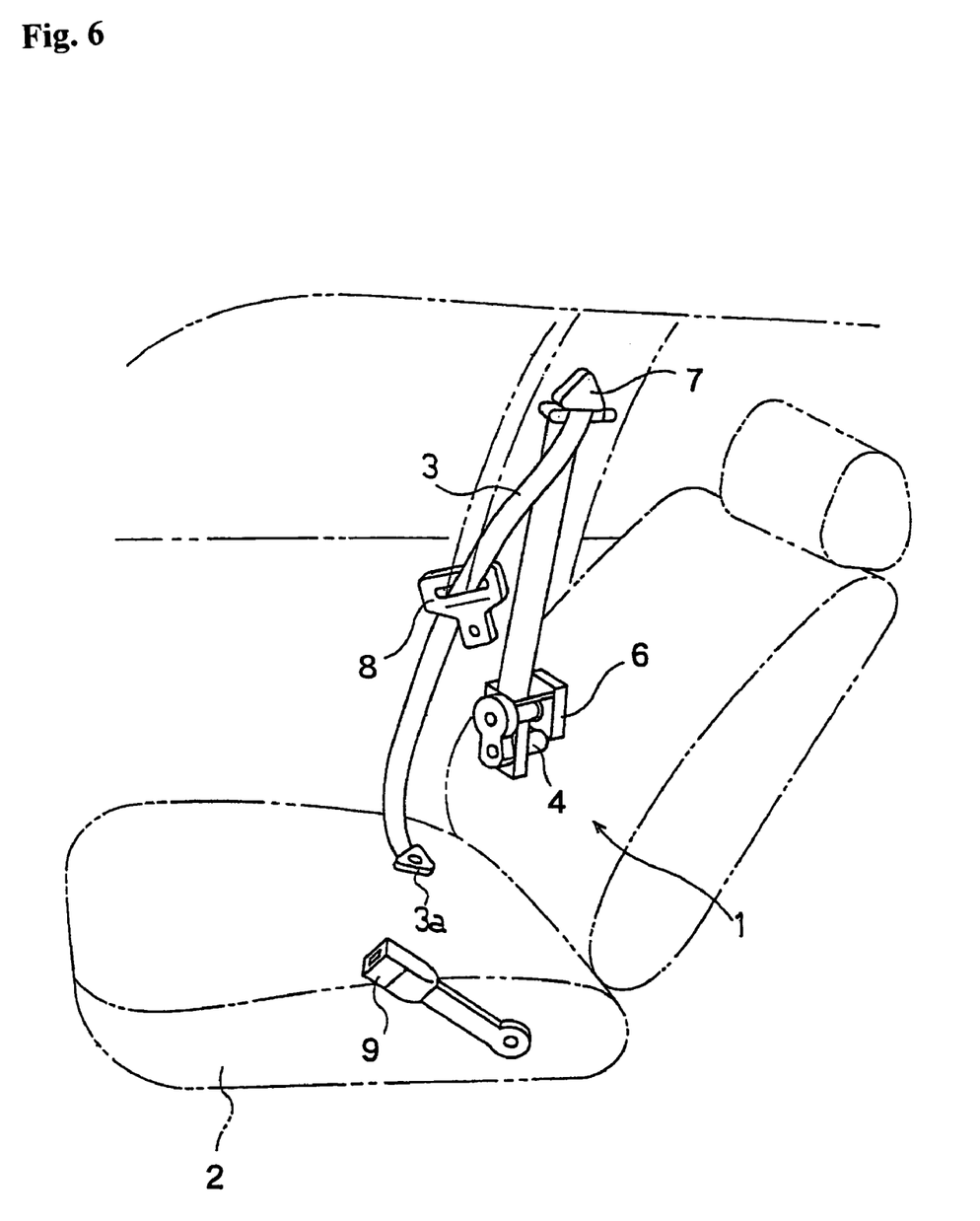
FIG. 6 is a schematic diagram of a conventional seat belt unit, according to an exemplary embodiment.
Figure 7:
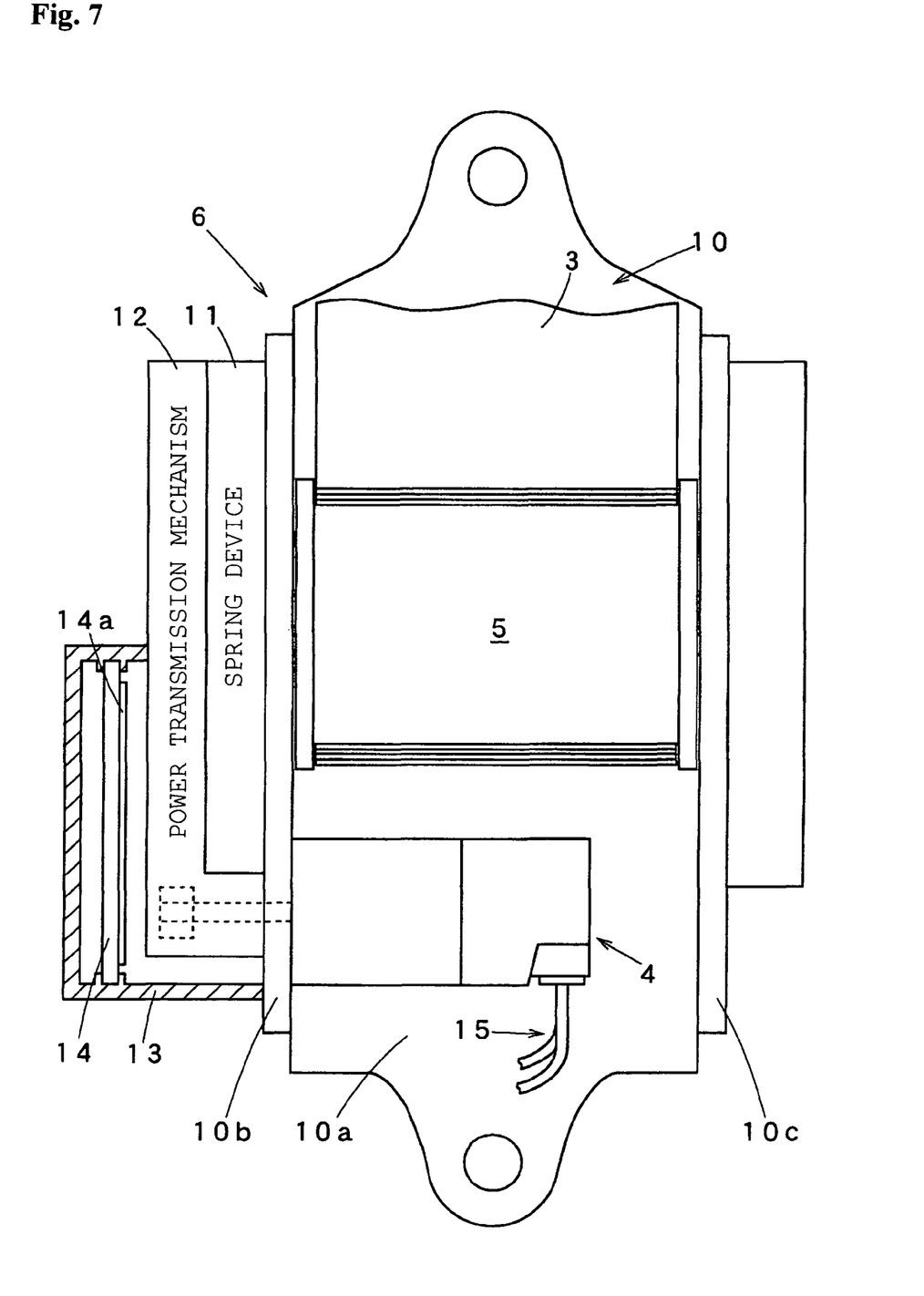
FIG. 7 is a schematic diagram of a seat belt retractor used in the seat belt unit shown in FIG. 6, according to an exemplary embodiment.

Referring to FIG. 6 and according to an exemplary embodiment, a seat belt unit may include a seat belt retractor that withdraws the belt by rotating a spool using an electric motor referring also to FIG. 7, more detail is given for the seat belt retractor used in the seat belt unit according to an exemplary embodiment.

As shown in FIGS. 6 and 7, the seat belt unit 1 includes a seat belt 3, a seat belt retractor 6, a guide anchor 7, a tongue 8, and a buckle 9. The seat belt 3 includes a belt anchor 3a at one end that may be fixed to the floor of the vehicle or a vehicle seat 2. The seat belt retractor 6 retracts the seat belt 3 by rotating a spool 5 using an electric motor 4. The guide anchor 7 guides the seat belt 3 when withdrawn from the seat belt retractor 6. The tongue 8 slidably supports by the seat belt 3. The buckle 9 is fixed to the floor of the vehicle body or the vehicle seat 2 with which the tongue 8 may be detachably engaged.

The seat belt retractor 6 includes a U-shaped frame 10 having side walls 10b and 10c extending from side rims of the back board 10a, a seat belt 3, a spool 5 that retracts the seat belt 3, a spring device 11 that urges or biases the spool 5 in the retracting direction, the motor 4 that serves as a driving means for rotating the spool 5, a power transmission mechanism 12 that converts the power of the motor 4 and transmits it to the spool 5, and a circuit board 14 having a printed circuit 14a supported by a cover 13 on the left side wall 10b of the frame 10 and controls the driving of the motor 4. The seat belt 3 may be retracted using the force of the spring device 11, the force of the motor 4, or the force of both.

The seat belt retractor 6 may also include (though not shown) a vehicle sensor (e.g., a deceleration sensing mechanism) on the right side wall 10c of the frame 10. The sensor may be activated when deceleration larger than a predetermined deceleration threshold is applied to the vehicle. A webbing sensor may be activated when the seat belt 3 is withdrawn faster than a typical withdrawing motion (e.g., a known withdrawing motion when the occupant wears the seat belt). A locking mechanism may also be activated by the vehicle sensor or the webbing sensor to lock the rotation of the spool 5 in the belt withdrawing direction.

An electrically conducting harness 15 extending from the motor 4 may include a motor connector at one end. The motor connector may be fixed to the frame 10. The seat belt retractor 6 may also include a circuit-board connector (not shown) at one end of an electrically conducting harness (not shown) extending from the circuit board 14. The circuit-board connector may be electrically connected to the motor connector.

The electronic control unit (ECUs) of the motor-driven seat belt retractor may be protected from water (e.g., water droplets). A cover 13 may be water resistant to at least partially protect the circuit board 14 from water droplets. For example, the cover 13 may include a sealant.

Electrical connections between the motor 4 and the circuit board 14 may extend the harness 15 from the motor 4, the motor connector, the circuit board 14, and the circuit-board connector.

An object of the invention is to provide a low cost, easy to assemble seat belt retractor in which the electronic control unit may be protected from water droplets and a seat belt unit including the retractor.

According to an exemplary embodiment, a seat belt retractor includes a frame having a back board and side walls extending from side rims of the back board, a spool rotatably supported by the frame for retracting a seat belt, a motor for rotating the spool, and an ECU for controlling the driving of the motor. The ECU may be mounted to the frame and include a base, an ECU board for controlling the driving of the motor, and a cover attached to the base to cover the ECU board. The ECU may include an opening at a lower end that opens an interior of the electronic control unit to an exterior.

According to a disclosed embodiment, the seat belt retractor includes a base comprising a guide wall for guiding liquid that entered the electronic control unit. The liquid may be guided to the right and left side rims of the base, where it may be dropped.

The ECU board of the seat belt retractor may include an ECU connector at a lower end. The connector is electrically connected to the ECU board and may be connected to any of a motor or a vehicle side electronic component including but not limited to a power supply.

In an exemplary embodiment, a seat belt unit includes a seat belt retractor for at least one of retraction and withdrawal of a seat belt by using a motor to rotate a spool, a tongue slidably supported by a seat belt withdrawn from the retractor, and a buckle to be detachably engaged by the tongue. The seat belt may restrain the occupant by engaging the buckle and the tongue.

According to an exemplary embodiment, the ECU may include an opening at the lower end. The opening allows the interior of the ECU to be opened downward to the exterior of the ECU. If liquid enters the electronic control unit, the liquid may be dropped through the opening. The ECU board and ECU connector may be effectively protected from liquid by preventing puddles of liquid from collecting in the ECU.

According to an exemplary embodiment, the base may include a guide wall for guiding liquid. If liquid enters from above, the liquid can be received and guided to the side rims of the base and may be dropped. The dropped liquid can then be discharged to the exterior through the opening at the lower end of the ECU, thereby preventing puddles of liquid from being collected in the ECU.

Furthermore, water droplets may be prevented from adhering to the ECU connector since the ECU connector may be located at the lower end of the ECU board where the collection of liquid may be inhibited.

According to an exemplary embodiment, the structure of the ECU board and the ECU connector may omit the harness for connecting the ECU board with the ECU connector to reduce cost and simplify assembly.

According to an exemplary embodiment, the ECU board and the ECU connector can be effectively protected from liquid in the ECU as described above. For example, if an occupant spills liquid onto the ECU, the structure can at least partially prevent the liquid from being collected in the ECU, thus protecting the ECU. Preventing liquid from collecting in the ECU may allow the tension and retraction of the seat belt to be effectively controlled by the motor for a long period of time when not in use.

Figure 1:
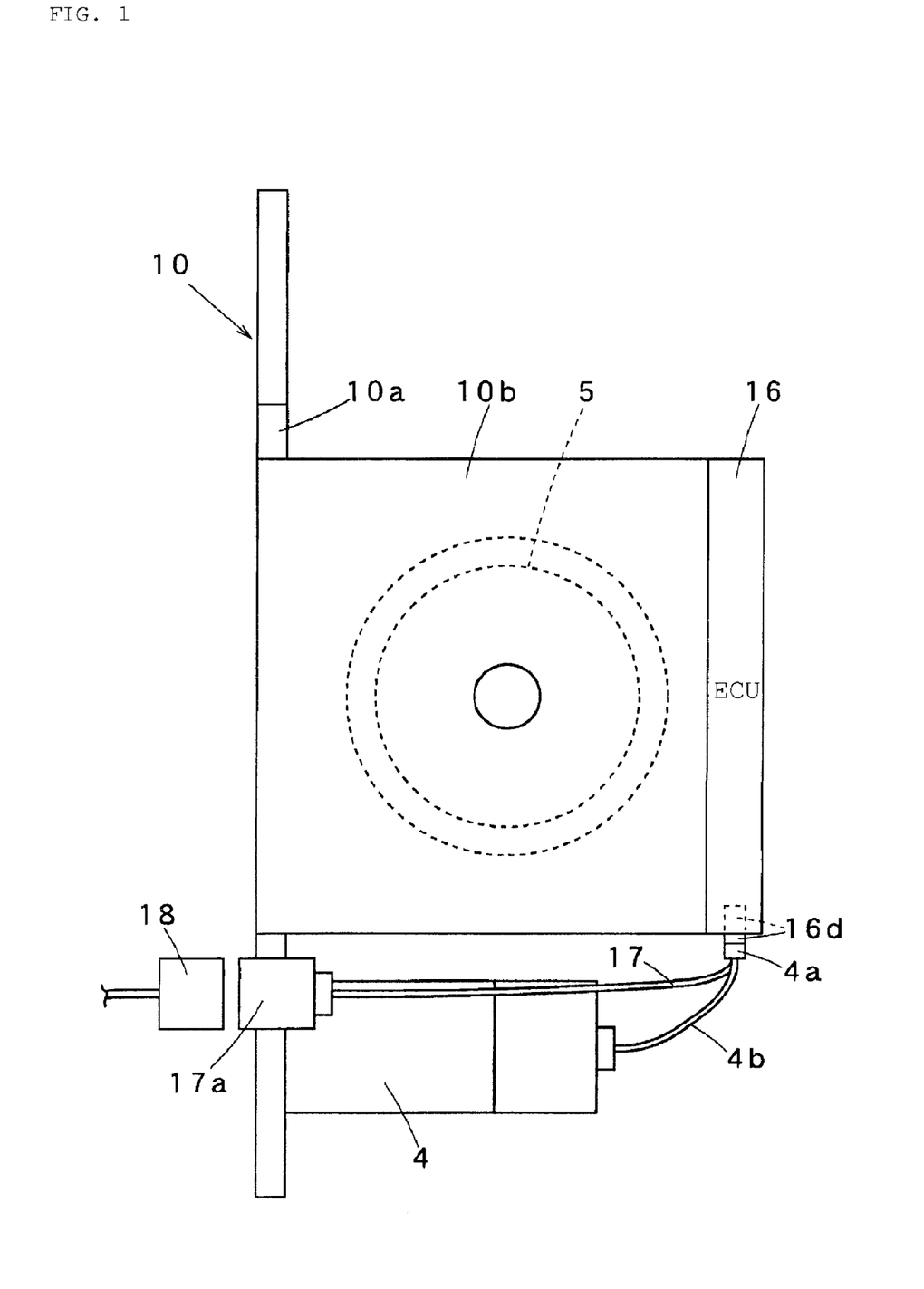
FIG. 1 is a schematic diagram showing a seat belt retractor, according to an exemplary embodiment.
Figure 2:
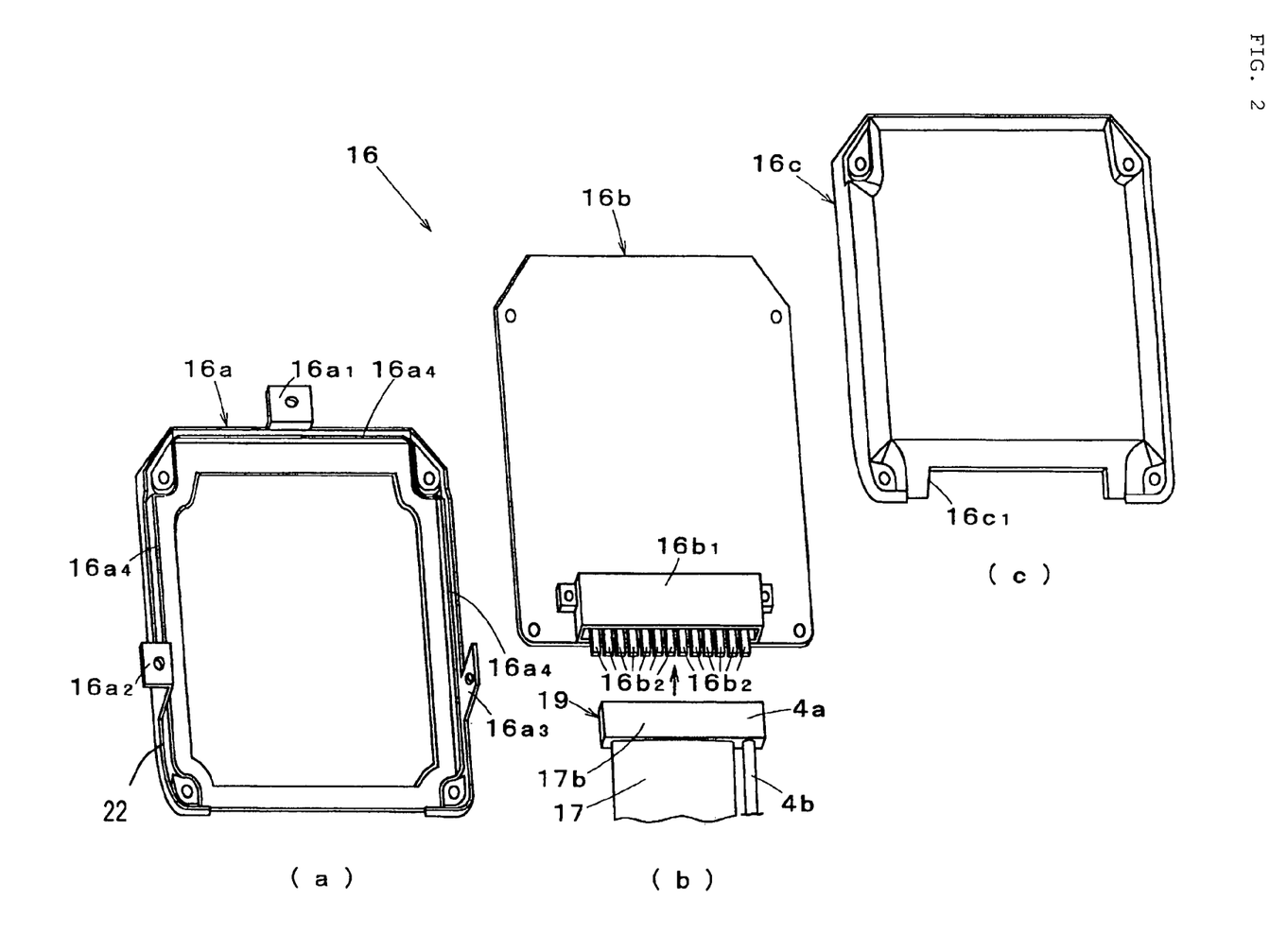

Referring to FIG. 1, a seat belt retractor 6 of an exemplary embodiment includes a plate-like ECU 16 for controlling the driving of a motor 4. Referring also to FIG. 2, the ECU 16 includes a base 16a, an ECU board 16b fixed to the base 16a and controlling the driving of the motor 4, and a cover 16c attached to the base 16a to cover the ECU board 16b.

The base 16a includes mounting sections 16a1, 16a2, and 16a3 for mounting to the frame 10. The base 16a further includes a guide wall 16a4 for receiving water droplets or liquid and for guiding them to the side rims of the base 16a so that the water droplets may drop or be removed. A rim 22 having left and right side rims is formed between opposing surfaces of the base 16a and the cover 16c and runs along a periphery of the base 16a.

The ECU board 16b includes an ECU connector 16b1 at the lower end. The ECU connector 16b1 includes a plurality of ECU connector terminals 16b2. The cover 16c includes an opening 16c1 that may open downward at the lower rim.

Figure 3:
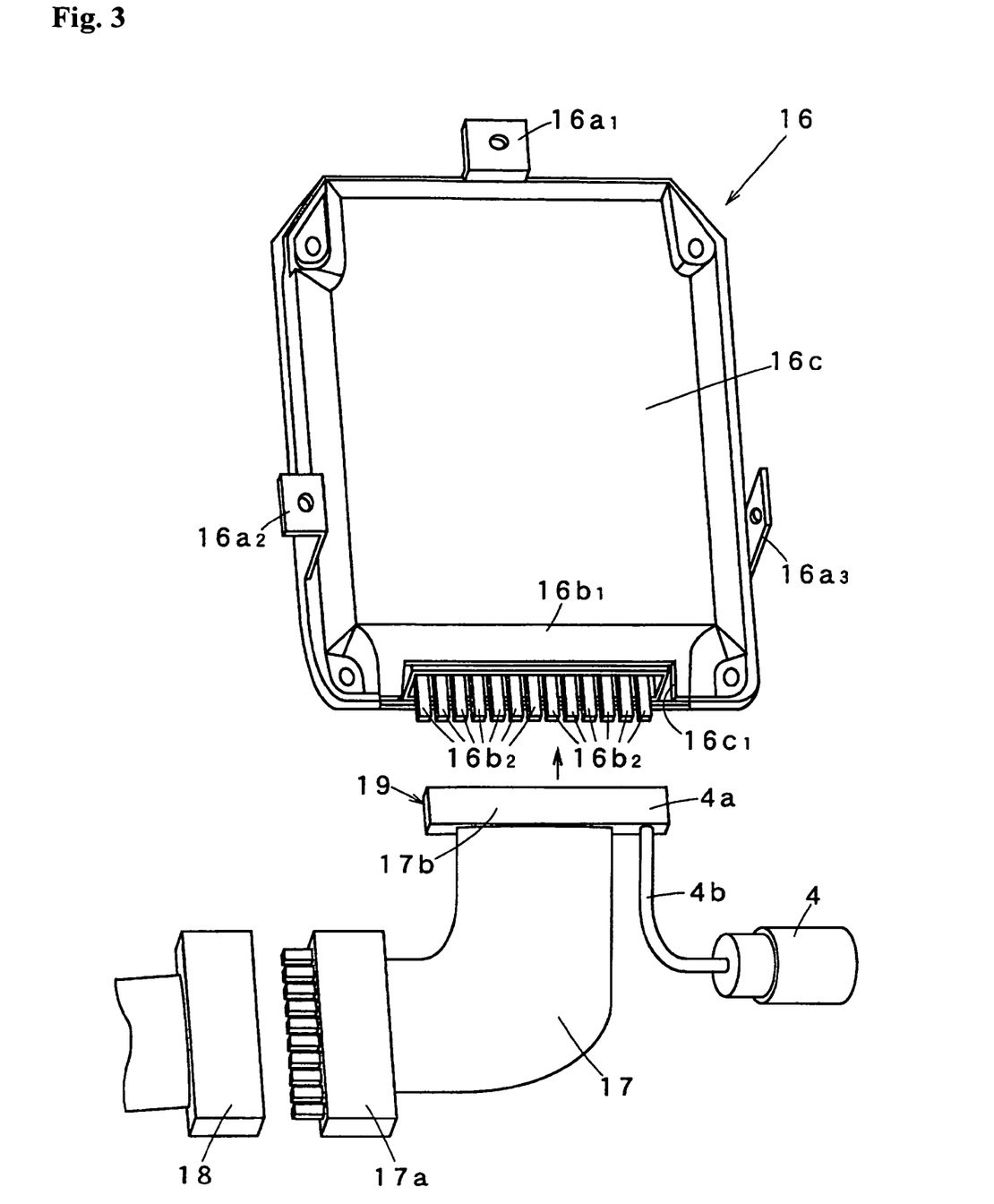
FIG. 3 is a perspective view of the ECU of FIG. 2, according to an exemplary embodiment.

Referring also to FIG. 3, the ECU board 16b including the ECU connector 16b1 may be placed on the base 16a. The cover 16c may be placed over the ECU board 16b, the ECU connector 16b1, and the base 16a and then may be fixed together to construct the ECU 16. With the ECU 16 assembled, the interior of the ECU 16 may open downward at one end through the opening 16c1 of the cover 16c.

The motor 4 may be fixed to the back board 10a of the frame 10. As shown in FIGS. 1 and 3, a harness 4b includes a motor connector 4a at one end and extends from the motor 4. The motor connector 4a may be electrically connected to a number of the plurality of ECU connector terminals 16b2.

Referring again to FIG. 1, the back board 10a of the frame 10 supports a vehicle-connector 17a at one end of an intermediate harness 17. As shown in FIGS. 1 and 3, the vehicle-connector connector 17a is electrically connected to a vehicle connector 18. The vehicle connector 18 may, with exception of the motor 4, be connected to vehicle-side electrical components such as the power supply of the vehicle. An ECU-connector 17b at the other end of the intermediate harness 17 may be electrically connected to the remainder of the plurality of ECU connector terminals 16b2. The motor connector 4a and the ECU-connector connector 17b may be generally formed of a single member. Thus, the ECU connector terminals 16b2 of the ECU connector 16b1 may be connected to the vehicle connector 18 using the intermediate harness 17 and connected to the motor 4 using the harness 4b.

The interior of the ECU 16 may be opened downward to the exterior of the ECU 16 since the seat belt retractor 6 includes the opening 16c1 at the lower end of the ECU 16. If water droplets enter the ECU 16, the water droplets may be dropped through the opening. This may prevent puddles of water droplets from being collected in the ECU 16, effectively protecting the ECU board 16b and the ECU connector terminals 16b2 from water droplets that have entered the ECU 16.

Since the base 16a includes guide wall 16a4, water droplets that enter from above may be received and guided to the side rims of the base 16a by the guide wall 16a4 and thereafter dropped. The water droplets dropped can be discharged to the exterior through the opening 16c1 at the lower end of the ECU 16. This prevents puddles of water droplets from being collected at the lower end in the ECU 16.

Since the ECU connector 16b1 may be at the lower end of the ECU board 16b, water droplets may be prevented from adhering to the ECU connector 16b1 because liquid is prevented from collecting at the lower end in the ECU 16 as described above.

According to other exemplary embodiments, the integral structure of the ECU board 16b and the ECU connector 16b1 may omit the conventional harness for connecting the ECU board 16b with the ECU connector 16b1 to reduce parts count and facilitates assembly.

Although not shown in FIG. 1, according to other exemplary embodiments, the seat belt retractor 6 may include the spring mechanism 11, the power transmission mechanism 12 shown in FIG. 7, a locking mechanism, a vehicle sensor, and/or a webbing sensor. Other operations and advantages of the seat belt retractor 6 may be similar to those of a conventional seat belt retractor. The rotational control of the spool 5 by the motor 4 may also be similar to that of a typical seat belt retractor with a motor.

In the exemplary embodiment shown in FIG. 3, the motor connector 4a and the ECU-connector 17b may be constructed of a single member 19. Alternatively, the motor connector 4a and the ECU-connector 17b of the seat belt retractor 6 may be separate as shown in FIG. 4.

Figure 4:
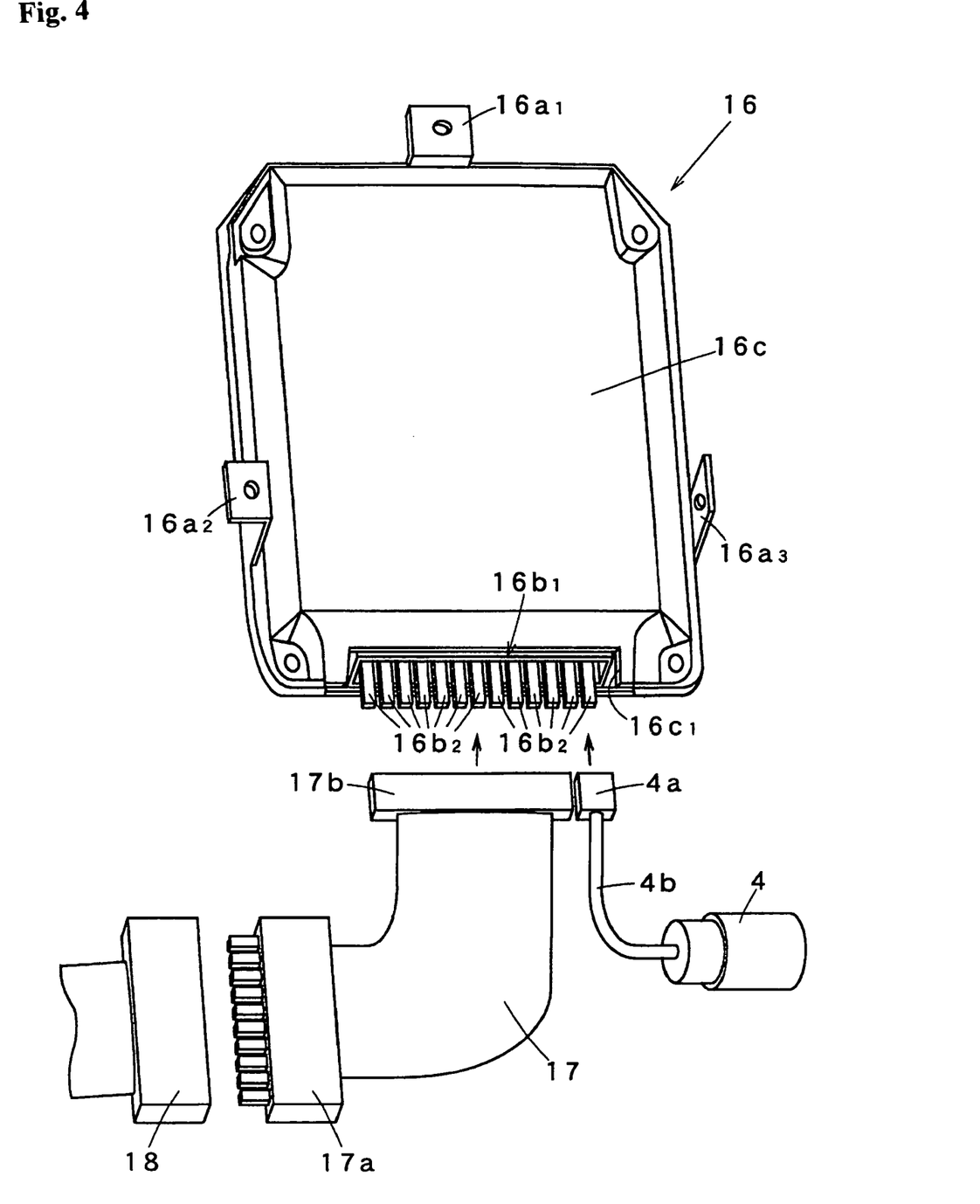
FIG. 4 is a schematic diagram of a seat belt retractor, according to an exemplary embodiment.

Other structures, operations, and advantages of the seat belt retractor 6 of the exemplary embodiment of FIG. 4 may be similar to those of the exemplary embodiment shown in FIG. 3.

Figure 5:
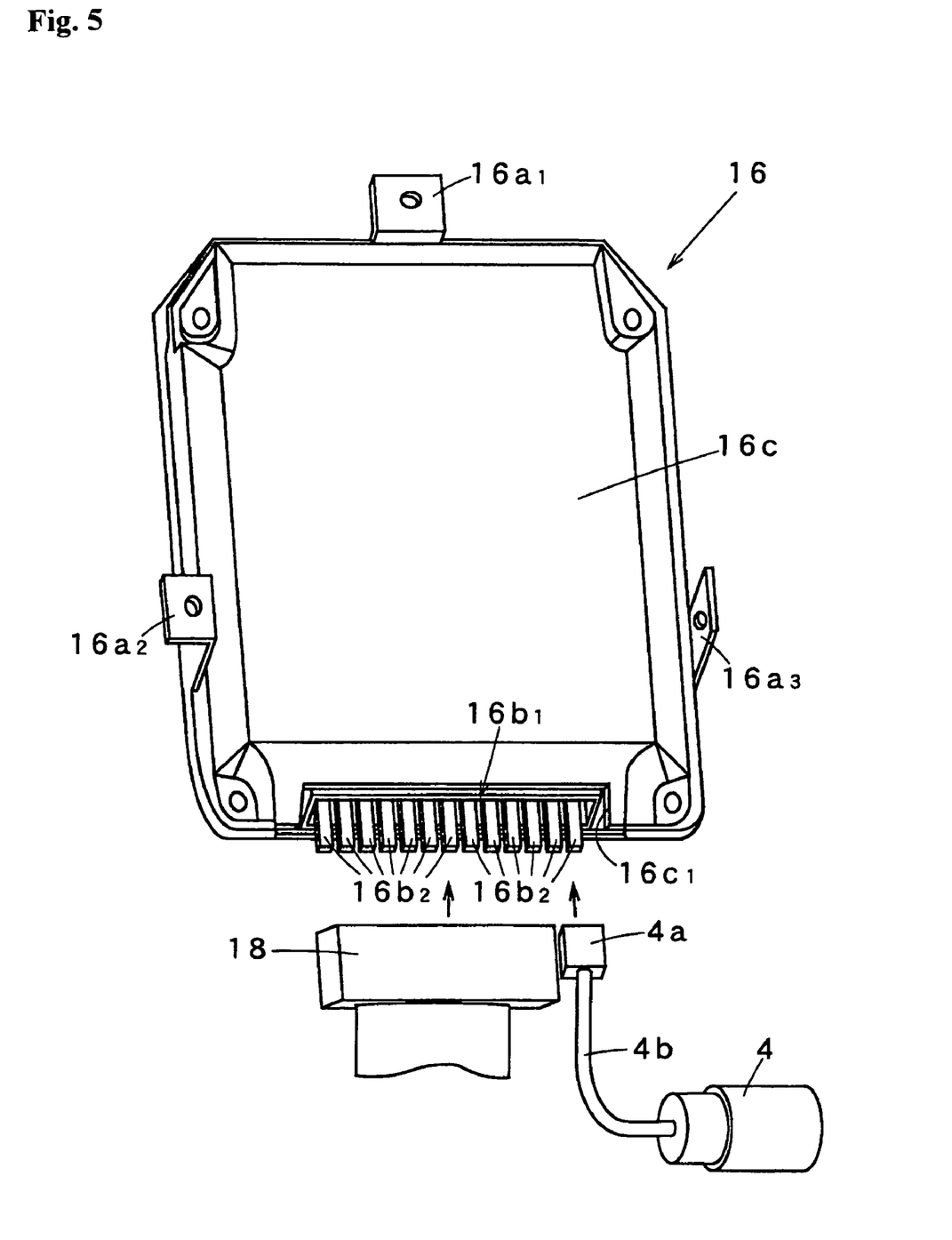
FIG. 5 is a schematic diagram of a seat belt retractor, according to an exemplary embodiment.

FIG. 5 illustrates a seat belt retractor according to another exemplary embodiment. Although the exemplary embodiment shown in FIG. 4 uses the intermediate harness 17, according to the exemplary embodiment of FIG. 5, the seat belt retractor 6 may not include the intermediate harness 17, but the vehicle connector 18 may be electrically connected to the ECU connector terminals 16b2 of the ECU connector 16b1. The other structures, operations, and advantages of the seat belt retractor 6 of FIG. 5 may be similar to those of the embodiment shown in FIG. 4.

In various exemplary embodiments the ECU connector 16b1 may be connected to both the motor connector 4a and the vehicle connector 18. According to other exemplary embodiments, the system may include a structure in which the ECU connector 16b1 is connected to only one of the motor connector 4a and the vehicle connector 18. According to various exemplary embodiments, the seat belt retractor may perform at least one of retraction and withdrawal of the seat belt.

The structure of the seat belt retractor of FIGS. 1-5 may be applied to the seat belt retractor of the three-point seat belt unit 1 shown in FIG. 6. The ECU board 16b and the ECU connector 16b1 can be effectively protected from water droplets in the ECU 16. If an occupant spills some liquid onto the ECU 16 the structure can prevent the liquid from being collected in the ECU 16, thereby protecting the ECU 16. This protection may allow the tension of the seat belt 3 to be effectively controlled by the motor 4 for a long time to provide occupant restraint.

The seat belt retractor and the seat belt unit of the exemplary embodiments may be suitable for seat belt retractors that perform at least one of belt retraction and withdrawal by controlling the rotation of the spool using a motor, and for seat belt units including a retractor.

The priority application, Japanese Patent Application No. 2007-227426, filed Sep. 3, 2007 including the specification, drawings, claims and abstract, is incorporated herein by reference in its entirety.

It is important to note that the arrangements of the seat belt retractor, as shown, are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited herein. Many modifications are possible without departing from the scope of the invention unless specifically recited in the claims. Accordingly, all such modifications are intended to be included within the scope of the present disclosure as described herein. The order or sequence of any process or method steps may be varied or re-sequenced according to alternative embodiments. Other substitutions, modifications, changes, and/or omissions may be made in the design, operating conditions and arrangement of the preferred and other exemplary embodiments without departing from the exemplary embodiments of the present disclosure as expressed herein.

What is claimed is:

1. A seat belt retractor comprising:
   at least one frame comprising a back board and side walls extending from side rims of the back board;
   a spool supported by the at least one frame configured to wind up a seat belt;
   a motor configured to rotate the spool; and
   an electronic control unit mounted to the frame for controlling the driving of the motor, the electronic control unit comprising:
      a base;
      an electronic control unit board fixed to the base; and
      a cover attached to the base to cover the electronic control unit board,
   wherein a rim having left and right side rims is formed between opposing surfaces of the base and the attached cover and runs along a periphery of the base,
   wherein the rim of the electronic control unit comprises an opening at a lower end that opens an interior of the electronic control unit to an exterior, and
   wherein the base comprises a guide wall for guiding liquid that has entered the electronic control unit to the left and right side rims of the base and dropping the liquid through the opening.

2. The seat belt retractor as claimed in claim 1, wherein the electronic control unit board comprises a connector at the lower end that is electrically connected to the electronic control unit board and can be connected to at least one of a connector of the motor or a vehicle connector to be connected to a vehicle-side electronic component.

3. The seat belt retractor as claimed in claim 2, wherein the rim of the electronic unit comprises a lower rim, wherein the opening is formed in the lower rim, and wherein the connector at the lower end has terminals that protrude through the opening.

4. The seat belt retractor as claimed in claim 1, wherein the rim of the electronic unit is formed on the base.

5. The seat belt retractor as claimed in claim 1, wherein the rim of the electronic control unit comprises a lower rim, and wherein the opening is formed in the lower rim.

6. A seat belt unit comprising:
   a seat belt retractor including at least one frame having a back board and side walls extending from side rims of the back board;
   wherein the retractor further includes a spool supported by the at least one frame configured to wind up a seat belt, a motor configured to rotate the spool in order to perform at least one of retraction and withdrawal of a seat belt, and an electronic control unit mounted to the frame for controlling the driving of the motor; wherein the electronic control unit includes a base, an electronic control unit board fixed to the base, and a cover attached to the base to cover the electronic control unit board; wherein a rim having left and right side rims is formed between opposing surfaces of the base and the attached cover and runs along a periphery of the base; and wherein the rim of the electronic control unit comprises an opening at a lower end that opens an interior of the electronic control unit to an exterior;
   a tongue slidably supported by the seat belt; and
   a buckle detachably engaged with the tongue,
   wherein the seat belt restrains the occupant by engagement of the tongue and the buckle, and
   wherein the base comprises a guide wall for guiding liquid that has entered the electronic control unit to the left and right side rims of the base and dropping the liquid through the opening.

7. The seat belt unit as claimed in claim 6, wherein the rim of the electronic unit is formed on the base.

8. The seat belt unit as claimed in claim 6, wherein the rim of the electronic control unit comprises a lower rim, and wherein the opening is formed in the lower rim.

9. The seat belt unit as claimed in claim 6, wherein the electronic control unit board comprises a connector at the lower end that is electrically connected to the electronic control unit board, wherein the rim of the electronic unit comprises a lower rim in which the opening is formed in the lower rim, and wherein the connector at the lower end has terminals that protrude through the opening.

* * * * *